April 12, 1960

L. KRAUS ET AL 2,932,370

AERODYNAMIC BRAKING MECHANISM FOR MOTOR VEHICLES

Filed June 11, 1956

5 Sheets-Sheet 1

Inventors
LUDWIG KRAUS AND
WERNER A. BRÜDER
BY Dicke and Craig
ATTORNEYS.

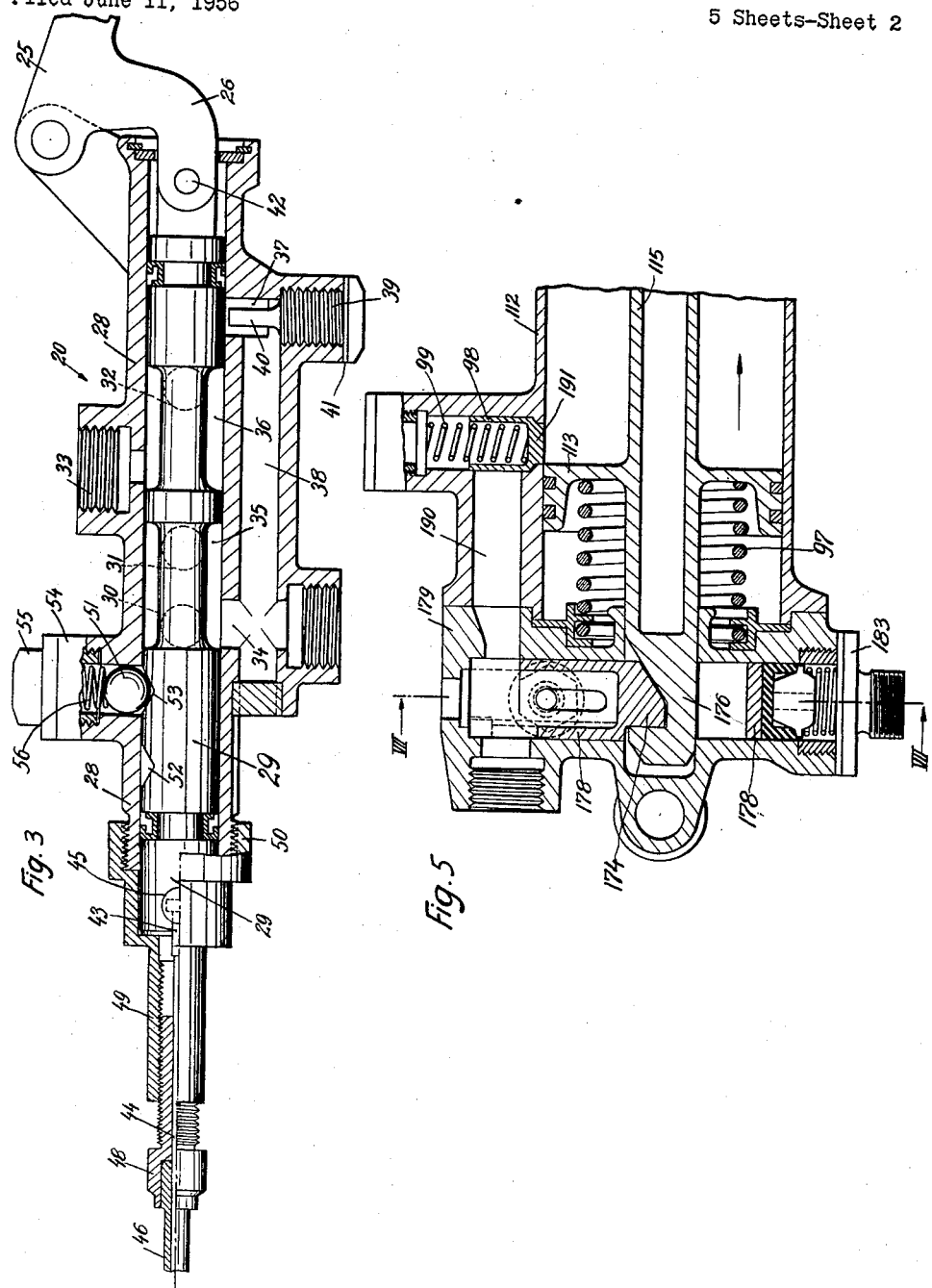

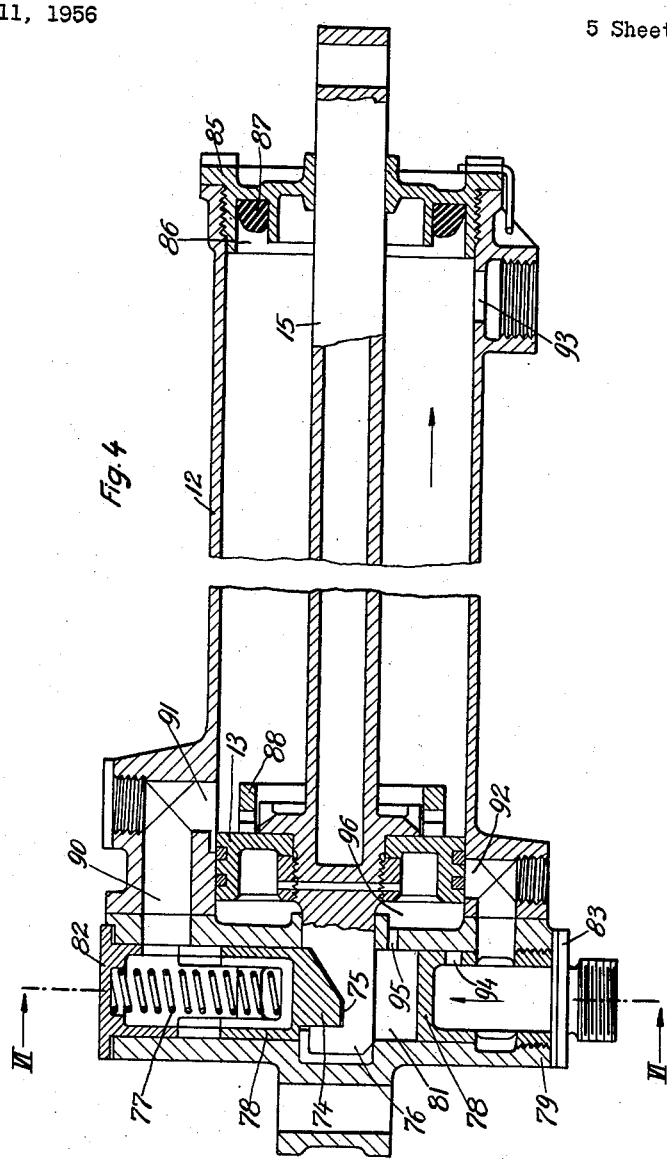

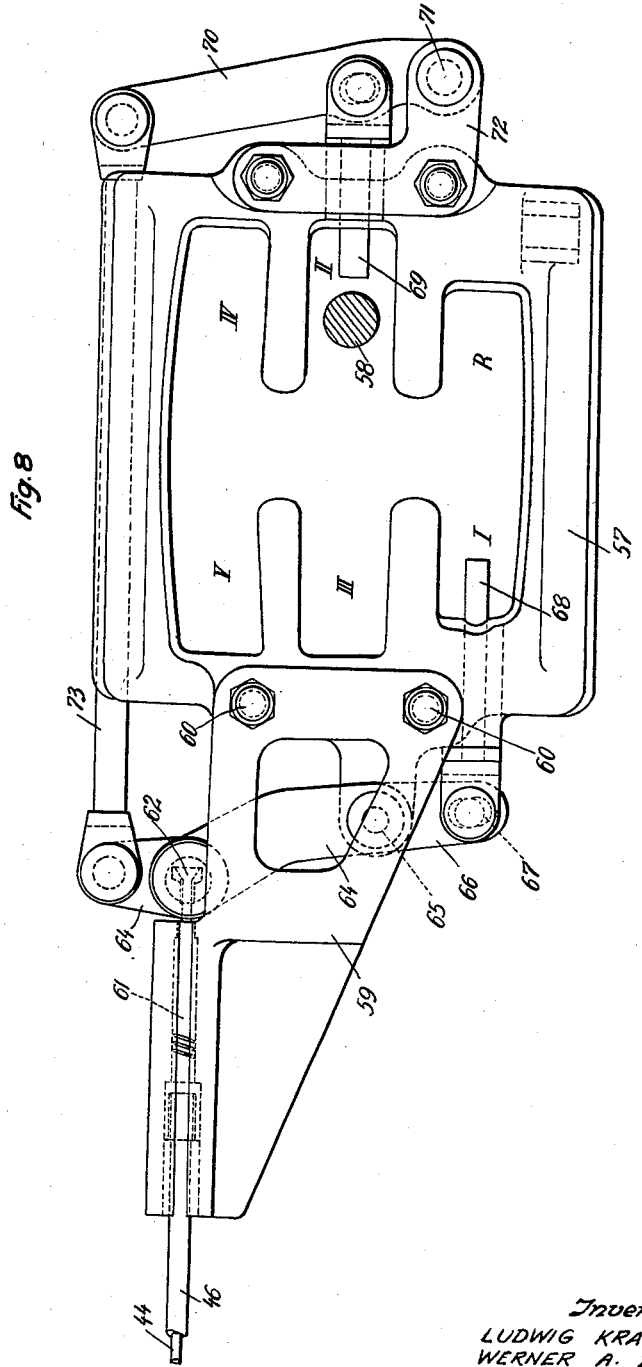

United States Patent Office 2,932,370
Patented Apr. 12, 1960

2,932,370
AERODYNAMIC BRAKING MECHANISM FOR MOTOR VEHICLES

Ludwig Kraus, Stuttgart-Rotenberg, and Werner A. Brüder, Stuttgart, Germany, assignors to Daimler-Benz Aktiengesellschaft, Stuttgart-Unterturkheim, Germany Application June 11, 1956, Serial No. 590,758
Claims priority, application Germany June 11, 1955
10 Claims. (Cl. 192—4)

Our invention relates to an aerodynamic braking mechanism for motor vehicles and, more particularly, to a braking mechanism of the type in which a wing is movably mounted on the vehicle and normally assumes an inactive position, but may be moved into an active position for producing air drag which will effectively brake the vehicle.

Aerodynamic braking systems of this type are particularly adapted for racing cars.

It is the object of our invention to provide improved actuating and controlling means for such an aerodynamic braking system so as to facilitate the control thereof rendering the same semi-automatic and thus relieving the driver from the necessity of using care and diligence in putting the braking system out of operation during a race prior to taking curves.

Other objects of the invention are to provide an improved aerodynamic braking mechanism in which the wing may be rapidly actuated in a smooth and reliable manner free from any shocks.

Further objects of our invention will appear from a detailed description of two embodiments of the invention with reference to the drawings following hereinafter. It is to be understood, however, that the invention is in no way limited to the details of such embodiments and that the terms and phrases used in such detailed description have been chosen for the purpose of illustrating the invention rather than that of limiting or restricting the same.

Figure 1:
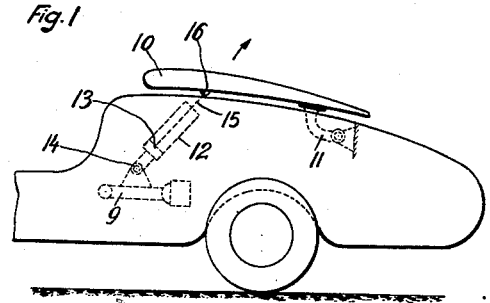
Figure 2:
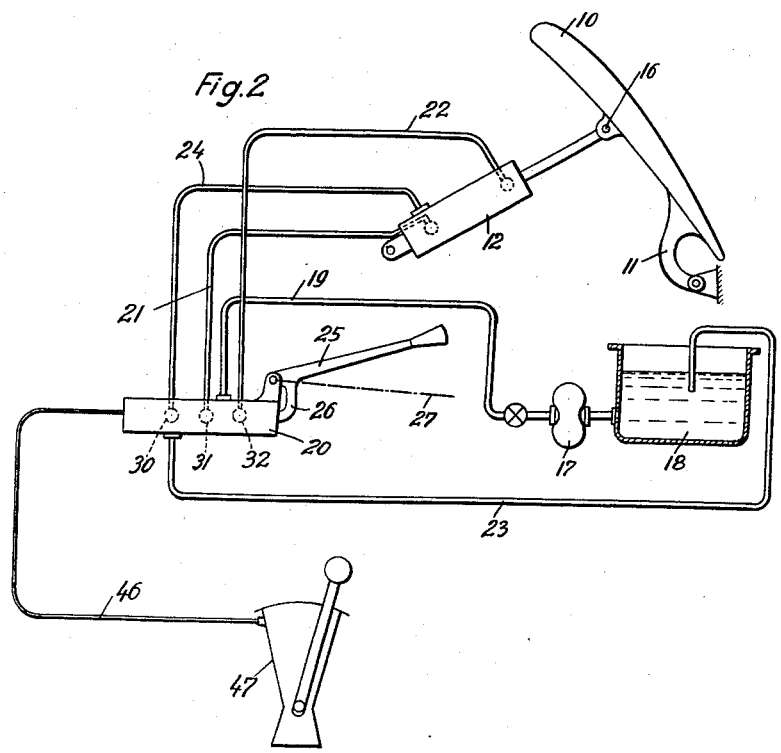
Figure 6:
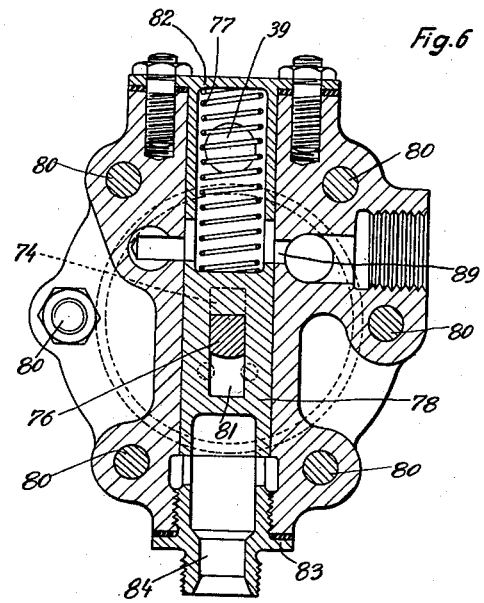
Figure 7:
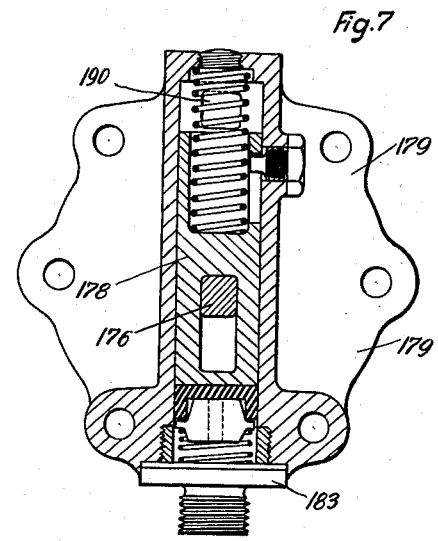

In the accompanying drawings,

Fig. 1 is an elevation of the rear part of a racing car equipped with the novel aerodynamic brake, Fig. 2 is a diagrammatic view of the actuating and controlling means included in the braking mechanism shown in Fig. 1, Fig. 3 is an axial section of the valve illustrated in Fig. 2, the valve actuating means being shown partly broken away, Fig. 4 is an axial section of the hydraulic driving mechanism composed of cylinder and piston illustrated in Fig. 1 in a more diagrammatic fashion, Fig. 5 is a partial longitudinal section of a modified hydraulic driving mechanism composed of cylinder and piston, Fig. 6 is the transverse section of the driving mechanism illustrated in Fig. 4, such section being taken along the line VI—VI in Fig. 4 viewed in the direction of the arrows, Fig. 7 is a transverse section taken through the driving mechanism illustrated in Fig. 5, such section being taken along the line VII—VII in Fig. 5 viewed in the direction of the arrows, and Fig. 8 a plan view of the speed change transmission of the racing car shown in Fig. 1 and of the associated control means.

As shown in Fig. 1, a wing 10 is mounted on the vehicle for movement into an inactive position shown in Fig. 1 and into an active position illustrated in Fig. 2. When in its active position the wing produces air drag for braking the vehicle.

Preferably, the wing has a cross-sectional profile of an air foil reducing its resistance to a minimum when in inactive position. In that position the wing is located above and slightly spaced from the top face of the tail end of the racing car as shown in Fig. 1.

Preferably, the wing is hinged to the vehicle body and for this purpose has depending arms 11 near its tail edge, such arms projecting through suitable openings into the interior of the body and being mounted on pivot pins having a common transverse horizontal axis.

A reversible hydraulic driving mechanism is connected to the vehicle body and to the wing 10 to move the same to one or the other of its positions. Preferably, such hydraulic driving mechanism is composed of a cylinder 12 having its lower end pivotally connected at 14 to a body frame member 9 for oscillation about a transverse horizontal axis, and of a piston 13 including a piston rod 15 which extends out of the upper end of the cylinder 12 and is pivotally connected to the wing 10 at a point 16. As will appear from Figs. 1 and 2, the hydraulic driving mechanism 12, 13 may be set in motion to move the wing 10 to its active position shown in Fig. 2 by the admission of a liquid under pressure supplied by a suitable source, such as a pump 17, from a reservoir 18 through a pipe 19 to a control valve 20 and thence through a pipe 21 to the lower end of the cylinder 12, the liquid being discharged from the upper end of the cylinder 12 through a pipe 22 via the valve 20 and a pipe 23 into the reservoir 18.

The valve 20 is preferably a reversing valve capable of being set to a braking position or to a non-braking position. In the former it causes the wing 10 to move to the active position shown in Fig. 2 and in the latter it causes the wing to be restored to the inactive position shown in Fig. 1. During the restoration of the wing to its inactive position the valve 20 permits the pressure fluid, such as oil, to be supplied from pipe 19 through pipe 22 to the upper end of the cylinder 12 and to be discharged from the lower end of the cylinder 12 through a pipe 24 and the return line 23.

Suitable means are provided for actuating the control valve manually or in a semi-automatic manner or both. In the embodiment shown, such actuating means comprises a hand lever 25 pivotally mounted on the housing of the control valve 20 and having a depending arm 26 connected to the slidable valve member to be described hereinafter with reference to Fig. 3. In Fig. 2 the hand lever 25 is shown in lifted condition in which it sets the reversing valve to the braking position. When the hand lever is depressed indicated by the dash-dotted line 27 it will shift the valve member to the non-braking position thus causing the restoration of the wing to its inactive position shown in Fig. 1.

As illustrated in Fig. 3, the reversing valve 20 comprises a housing 28 having a cylindrical bore slidably accommodating a valve member 29. The housing 28 is provided with three longitudinally spaced ports 30, 31 and 32 connected to the cylinder 12 through the pipes 24, 21 and 22 respectively and with three additional ports 33, 34 and 37 connected to the pressure pipe 19 and to the return line 23 respectively. The communication of the ports 30, 31 and 32 with the inlet port 33 and the discharge ports 34 and 37 is controlled by a pair of circumferential grooves 35 and 36 provided in the slidable valve member 29. The ports 34 and 37 are in permanent communication through a passageway 38 provided in the housing 28 and extending substantially parallel to the slidable valve member 29. An adjustable threaded member 39 is inserted in a tapped bore of the housing in alignment with the port 37 and is provided with a projection 40 which extends into the port 37 and serves the purpose of throttling the flow of liquid therethrough. By insertion of a washer 41 between the housing and the head of the threaded member 39 the distance of projection of the member 40 into the port 37 may be varied to thereby adjust the throttling effect. The arm 26 of the hand lever 25 carries a pin 42 engaging a transverse slot provided in the end of the valve member 29. The other end of the valve member is provided with an axial bore 43 for the accommodation of the end of a wire 44 and with a transverse bore 45 for the accommodation of a coupling member adapted to secure the end of the wire 44 to the end of the valve member 29. The wire 44 is the core of a Bowden cable 46 leading to the transmission 47 of the racing car. The outer sheath of the Bowden cable 46 is secured to a nipple 48 screwed into an internal threaded tubular projection 49 of a cover 50 closing the end of housing 28.

By actuating means associated with the speed change transmission of the racing car shown in Fig. 1, which means will be described hereinafter with reference to Fig. 8, the wire 44 and the valve member 29 are pulled to the position shown in Fig. 3 whenever the transmission is in its 1st speed position or 2nd speed position thus swinging the hand lever 25 to its lowermost position. In this position the hydraulic driving mechanism is caused to keep the braking wing in its inactive position shown in Fig. 1. The pressure fluid supplied by pipe 19 to port 33 passes through groove 36, port 32 and pipe 22 to the upper end of cylinder 12 depressing the piston therein. During the restoration of wing 10 to its inactive position shown in Fig. 1, the pressure fluid is discharged from the lower end of the cylinder 12 through pipe 24, port 30, groove 35, port 34 and return line 23 into the reservoir 18.

When the driver, while driving the vehicle at a high speed with the transmission set to third, fourth or fifth gear, wishes to apply the brake he will lift the hand lever 25 to the position shown in Fig. 2 thereby moving the valve member 29 to its right hand braking position (not shown) in which it will be resiliently detained by engagement of a detent ball 51 with a recess 52 provided in the valve member 29. When the latter is in the non-braking position shown in Fig. 3, the detent ball 51 engages a similar recess 53. The ball 51 is slidably guided in the radial bore provided in a boss 54 of the housing 28 and closed by a threaded plug 55, a spring 56 being interposed between the plug and the ball.

When the valve is set into its braking position the liquid under pressure supplied through pressure pipe 19 to port 33 will pass through grove 35, port 31 and pipe 21 to the lower end of cylinder 12 moving piston 13 upwardly to thereby erect the wing 10. During this operation the liquid is discharged from the upper end of cylinder 12 through pipe 22, port 32, groove 36, restricted port 37, passageway 38 and return line 23 to the reservoir 18. The member 40 is so adjusted as to throttle this stream of liquid in a manner preventing the air flow hitting the bottom of wing 10 from abruptly pulling piston 13 outwardly.

In Fig. 8 there is shown the top plate 57 of the gear shift transmission provided with the conventional guiding slots for guiding the gear shift lever 58 to its various positions. The transmission has five forward speeds and one reverse speed indicated by the Roman numerals I, II, III, IV and V and by the letter R. A bracket 59 fixed to the top plate 57 by bolts 60 is provided wtih a horizontal longitudinal bore 61 in which the outer sheath of the Bowden cable 46 is fixed. The wire 44 extends through the bore and is secured by suitable connecting means to a pivot pin 62 journalled in a bore of the longer arm 64 of a two-armed lever fulcrumed on a pivot pin 65 carried by a suitable projection of plate 57. The shorter arm 66 of the two-armed lever has a pin-and-slot connection 67 with a horizontal push rod 68 slidably mounted in a longitudinal bore of the top plate 57 so as to enter the guideway I for the first period. When the driver on a racing course has put the aerodynamic brake in operation by lifting the handle 25 and has thus slowed down the car before entering a curve he will shift the gear shift lever 58 to its 1st speed position moving it into the guideway I. In this operation the gear shift lever 58 will engage the push rod 68 and will push same outwardly thereby rocking the two-armed lever 66, 64 about its fulcrum 65 in clockwise direction pulling the wire 44 to the position shown in Fig. 3 whereby the valve member 29 is shifted to its non-braking position causing the wing 10 to be restored into inactive position.

A similar operation occurs when the gear shift lever is shifted to its 2nd speed position. In that position it will engage a push rod 69 pivotally connected to a lever 70 fulcrumed on a pin 71 carried by a bracket 72 bolted to the top plate 57. The end of lever 70 is connected with the end of lever arm 64 by a connecting rod 73.

The valve 20 is preferably disposed near the instrument panel of the car. The piston 13 is preferably associated with locking or latching means for locking the piston in the inactive position of the wing 10. Fig. 4 illustrates a longitudinal section taken through the cylinder 12 and the piston 13. The locking means comprises a locking or latching tooth 74 guided for movement in radial direction with respect to the cylinder 12 and adapted to engage a recess 75 provided in a tongue 76 which projects from the bottom face of piston 13 in axial direction. Preferably, a spring 77 tends to render the locking means 74 effective and fluid-operable means are provided to move the locking means to ineffective position.

In the embodiment shown, such fluid-operable means comprises a piston 78 slidably guided in a diametrical bore of the cylinder cover 79 which is secured to the cylinder 12 by circumferentially distributed bolts 80 (Fig. 6). The piston 78 is formed with a central diametrical passageway 81 through which the tongue 76 projects. The tooth 74 is integral with the piston 78 for guidance by the same. The ends of the diametrical bore of the cylinder cover 79 are closed by plugs 82 and 83 and the spring 77 is inserted between the plug 82 and the piston 78. The plug 83 is provided with a port 84 for the admission of fluid under pressure through the pipe 21.

The other end of cylinder 12 is covered by a cover plate 85 surrounding the piston rod 15 and formed on its inside with an annular groove 86 for the accommodation of a ring 87 of rubber or a rubber-like plastic. This ring constitutes a resilient buffer which is coordinated to the driving mechanism to absorb any shock coincidental to the arrival of the wing 10 in its active position. For this purpose, the piston 13 has an annular abutment 88 which upon such arrival engages groove 86 and is brought to a gradual stop by the buffer ring 87.

The wall of the diametrical bore of the cylinder cover 79 is provided with a port 89 (Fig. 6) communicating with the discharge pipe 24. When the piston 78 is in the locking position illustrated in Figs. 4 and 6, it uncovers the port 89 thus establishing a communication between the pipe 24 and the space accommodating spring 77, such space being in permanent communication through a passageway 90 with a port 91 provided in the wall of cylinder 12. At the end of the restoring stroke of piston 13 to the position shown in Fig. 4, the discharge port 92 provided in the cylinder wall and permanently communicating with the pipe 21 will be covered by the piston when the port 91 will be uncovered thereby.

When the driver lifts handle 25 causing oil under pressure to be supplied through pipe 21 to port 84 of plug 83, the pressure liquid will lift piston 78 as the liquid displaced by piston 78 from the space accommodating spring 77 may escape through passageway 90, port 91, port 93 provided at the upper end of the cylinder 12, and pipe 22.

It is the purpose of pipe 24 to relieve pump 17 from pressure when the braking wing is in its inactive position by establishing a short circuit as follows: pressure pipe 19, port 33, groove 36, port 32, pipe 22, port 93, port 91, passageway 90, the space accommodating spring 77, port 89, pipe 24, port 30, groove 35, port 34, and return line 23. Although port 91 is uncovered just before piston 13 will arrive in its home position, the short circuit path just described will not be established until the piston has completed its travel and the locking tooth 74 has entered the recess 75 thus uncovering port 89.

It will be noted that when the piston 13 is in its home position it closes the port 92. This has the effect of relieving the locking tooth 74 from any pressure exerted by piston 13 until the locking tooth 74 has been disengaged. As soon as this disengagement occurs a port 94 provided in the piston 78 near its lower end will arrive in registry with a port 95 admitting the fluid under pressure from port 84 to the space 96 between the piston 13 and the cylinder cover 79.

In Fig. 5 another embodiment of the hydraulic driving mechanism is illustrated. This embodiment differs from that shown in Fig. 4 by the absence of port 92 and port 95 and by the provision of a spring 97 inserted between the cylinder cover 179 and the piston 113 movable in the cylinder 112. The piston is formed with a piston rod 115 performing the same function as piston rod 15. When oil under pressure is supplied to the port of plug 183 it will lift the piston 178 to thereby disengage the tooth 174 from the recess provided in the tongue 176 of the piston 113. At the same time the piston 178 will close the passageway 190 and will thus interrupt the short circuit path above described. Upon disengagement of the locking tooth 174 the spring 97 will move piston 113 to its upper end position. In this embodiment, the space accommodating the spring 97 remains free from liquid and is vented by a suitable vent (not shown) in order to prevent liquid from entering this space. The port 191 is closed by a check valve 98 subjected to the action of a spring 99. This valve remains closed except when piston 113 is nearly or fully in its home position.

From the foregoing description of two preferred embodiments of our invention it will appear that we have provided an improved aerodynamic brake including a hydraulic driving mechanism fixed to the vehicle body and to the braking wing and preferably comprising a cylinder and a piston, such driving mechanism being controlled automatically in dependence on the operating condition of the vehicle and preferably arbitrarily by hand through the intermediary of a valve causing the driving mechanism to move the wing into one or the other direction.

Preferably, locking means are provided for locking the movable member of the hydraulic driving mechanism, such as the piston and the piston rod, in their home position when the braking wing is retracted, such locking means being rendered effective by mechanical means, such as a spring, and being released by fluid pressure under control of said valve when the braking wing is to be moved to active position. The valve is preferably provided with resilient detent means and connected with a hand lever permitting to put the hydraulic driving mechanism into operation. The valve preferably includes a restricted passageway for throttling the operating fluid discharged from the hydraulic driving mechanism when the braking wing is moved to active position to thereby control the speed of movement of the braking wing to active position.

Preferably, the valve is cooperatively coordinated to the gear shift lever of the vehicle, for instance through a Bowden wire, whereby the wing is automatically restored to its inactive position when the transmission is shifted to a low speed position.

The hydraulic driving mechanism, particularly the cylinder, may be provided with damping means, such as an annular buffer, serving to absorb any shock coincidental to the movement of the wing to its active position. The locking means preferably control ports for the admission of the liquid to and the discharge from the cylinder of the driving unit. Moreover, a spring may be interposed between the stationary part and the movable part of the hydraulic driving mechanism, such spring serving to move the wing to active position after the locking means have been released.

The embodiments described have proved highly effective in practical operation. It has been found that the manually controlled driving mechanism requires but little attention. The cooperative connection of the valve with the gear shift lever offers great advantage as it permits the driver when taking curves to keep his hand on the steering wheel, or the gear shift lever respectively, the aerodynamic brake being automatically inactivated at a time when the driver wishes to accelerate the vehicle again.

While the invention has been described in connection with a number of different embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

What we claim is:

1. In a motor vehicle having a change speed transmission, the combination comprising a wing mounted on the vehicle for movement into an inactive position and into an active position for producing air drag for braking purposes, a reversible hydraulic driving mechanism connected to said vehicle and to said wing to move the same to one or the other one of said positions, a source of pressure fluid, a control valve connecting said source to said mechanism, means for actuating said control valve to move said wing to its active braking position while said transmission is engaged to provide one speed ratio, and means operatively connected to said change speed transmission for actuating said control valve to effect change of position of said wing in response to engagement of said transmission to provide another speed ratio.

2. In a motor vehicle having a change-speed transmission, the combination comprising a wing hinged to the vehicle body for pivotal movement into an inactive position and into an active position for producing air drag for braking purposes, a hydraulic driving mechanism composed of cylinder and piston connected to said vehicle body and to said wing to move the latter to one or the other one of said positions, a source of pressure fluid, a reversing valve capable of being set to a braking position or to a non-braking position and hydraulically connected with said source and said cylinder to control the admission and discharge of pressure fluid to and from the latter, means for selectively shifting said valve to said braking position or to said non-braking position, means for actuating said control valve to move said wing to its active braking position while said transmission is engaged to provide one speed ratio and means operatively connected to said change-speed transmission for actuating said control valve to effect change of position of said wing in response to engagement of said transmission to provide another speed ratio.

3. In a motor vehicle having a change-speed transmission, an instrument panel and a driver's seat, the combination comprising a wing hinged to the vehicle body for pivotal movement into an inactive position and into an active position for producing air drag for braking purposes, a hydraulic driving mechanism composed of a cylinder and a piston connected to said vehicle body and to said wing to move the latter to one or the other one of said positions, said hydraulic driving mechanism being disposed within the vehicle body behind said driver's seat with the cylinder being pivotally mounted to said body and the piston including a piston rod pivotally connected to said wing at a point spaced from and disposed in front of the axis of said pivotal movement, a source of pressure fluid, a reversing valve capable of being set to a braking position or to a non-braking position and including pipes hydraulically connecting said valve with said source and said cylinder to control the admission and discharge of pressure fluid to and from the latter, said valve being disposed near said instrument panel, means for selectively shifting said valve to said braking position or to said non-braking position, and means operatively connected to said change-speed transmission for actuating said control valve in response to engagement of a predetermined active transmission speed to effect change of position of said wing.

4. In a motor vehicle, the combination comprising a wing hinged to the vehicle body for pivotal movement into an inactive position and into an active position for producing air drag for braking purposes, a hydraulic driving mechanism composed of cylinder and piston connected to said vehicle body and to said wing to move the latter to one or the other one of said positions, a source of pressure fluid, a reversing valve capable of being set to a braking position or to a non-braking position and hydraulically connected with said source and said cylinder to control the admission and discharge of pressure fluid to and from the latter, means for selectively shifting said valve to said braking position or to said non-braking position, and resilient detent means for detaining said reversing valve in one or the other of its positions, said means for selectively shifting said valve being constituted by a hand lever cooperatively connected to said valve.

5. In a motor vehicle, the combination comprising a wing hinged to the vehicle body for pivotal movement into an inactive position and into an active position for producing air drag for braking purposes, a hydraulic driving mechanism composed of cylinder and piston connected to said vehicle body and to said wing to move the latter to one or the other one of said positions, a source of pressure fluid, a reversing valve capable of being set to a braking position or to a non-braking position and hydraulically connected with said source and said cylinder to control the admission and discharge of pressure fluid to and from the latter, means for selectively shifting said valve to said braking position or to said non-braking position, and actuating means coordinated to the speed change transmission of the motor vehicle and adapted to be actuated by the gear shift lever thereof when same is shifted to first gear or second gear, and said actuating means being connected with said valve to move same to said non-braking position when the transmission is shifted to first gear or second gear.

6. In a motor vehicle, the combination comprising a wing mounted on the vehicle for movement into an inactive position and into an active position for producing air drag for braking purposes, a reversible hydraulic driving mechanism connected to said vehicle and to said wing to move the latter to one of the other one of said positions, said driving mechanism comprising a cylinder and a piston movable therein to actuate said wing, latching means for locking said piston in a position corresponding to one of the positions of said wing, fluid-operable means for releasing said latching means, a common fluid passage for supplying pressure fluid to said cylinder to actuate the piston therein and to said fluid-operable means to release the latching means, a source of pressure fluid, a control valve connecting said source to said common fluid passage for effecting both release of the latching means and movement of said piston in response to predetermined operation of said control valve, and means for applying a force biasing said wing toward its active position during driving operation of the vehicle, said latching means acting to hold said wing in the inactive position against said biasing force.

7. In a motor vehicle, the combination comprising a wing mounted on the vehicle for movement into an inactive position and into an active position for producing air drag for braking purposes, a reversible hydraulic driving mechanism connected to said vehicle and to said wing to move the latter to one or the other of said positions, a source of pressure fluid, a control valve connecting said source to said mechanism to regulate the supply of pressure fluid thereto, means for actuating said control valve, locking means for mechanically restraining said driving mechanism against movement from a position corresponding to one of the positions of said wing, means responsive to operation of said actuating means for the control valve for releasing said locking means, and control means between said control valve and said driving mechanism for blocking the application of pressure fluid to said driving mechanism until said locking means is released.

8. The combination according to claim 7, wherein the means for releasing said locking means is operated by fluid pressure controlled by said control valve.

9. In a motor vehicle, the combination comprising a wing mounted on the vehicle for movement into an inactive position and into an active position for producing air drag for braking purposes, a reversible driving mechanism comprising a cylinder and a piston therein connected between the vehicle and said wing to move the latter to one or the other of said positions, a spring connecting the cylinder and piston of said driving mechanism and tending to move said piston to actuate said wing into said active position, said wing being arranged to be further aided in movement to its active position during vehicle movement by the air drag forces, a source of pressure fluid, a valve connecting said source to said cylinder and controlling the application of fluid pressure to the latter to move said piston in the opposite direction to actuate said wing into said inactive position, locking means for latching said piston in the position corresponding to said inactive position, and means for releasing said latching means actuated by predetermined operation of said control valve.

10. In a motor vehicle, the combination comprising a wing hinged to the vehicle body for pivotal movement into an inactive position and into an active position for producing air drag for braking purposes, a hydraulic driving mechanism composed of cylinder and piston connected to said vehicle body and to said wing to move the latter to one or the other one of said positions, a source of pressure fluid, a reversing valve capable of being set to a braking position or to a non-braking position and hydraulically connected with said source and said cylinder to control the admission and discharge of pressure fluid to and from the latter, resilient means for detaining said reversing valve in one or the other of its positions, and means for selectively shifting said valve to said braking position or to said non-braking position, further comprising a change speed transmission having a gear shift lever, and actuating means operatively connected to said speed change transmission of the motor vehicle and adapted to be actuated by said gear shift lever thereof when the same is shifted to one of the lower transmission ratios, and said actuating means being connected with said valve to move the same to said non-braking position when the transmission is shifted to said one of the lower transmission ratios.

References Cited in the file of this patent
UNITED STATES PATENTS

| 1,995,905 | Sikorsky | Mar. 26, 1935 |
| 2,024,394 | Sillcox | Dec. 17, 1935 |
| 2,199,333 | Dunklin | Apr. 30, 1940 |
| 2,239,854 | McCormick | Apr. 29, 1941 |
| 2,770,326 | Wayman | Nov. 13, 1956 |

FOREIGN PATENTS

| 710,740 | Germany | Sept. 19, 1941 |